(12) United States Patent
Kaplan (10) Patent No.: US 7,054,276 B2
(45) Date of Patent: May 30, 2006

(54) SYSTEM AND METHOD FOR A MULTICAST NETWORK MESSAGING SERVICE

(75) Inventor: Marc Adam Kaplan, Katonah, NY (US)

(73) Assignee: International Business Machines Corporation, Armonk, NY (US)

( * ) Notice: Subject to any disclaimer, the term of this patent is extended or adjusted under 35 U.S.C. 154(b) by 958 days.

(21) Appl. No.: 09/778,300

(22) Filed: Feb. 7, 2001

(65) Prior Publication Data

US 2002/0146008 A1    Oct. 10, 2002

(51) Int. Cl.
*H04L 12/28* (2006.01)

(52) U.S. Cl. .................................. 370/256; 370/390

(58) Field of Classification Search ............. 370/216, 370/217, 218, 221, 225, 256, 389, 390, 396, 370/400–408
See application file for complete search history.

(56) References Cited

U.S. PATENT DOCUMENTS

| | | | |
|---|---|---|---|
| 4,864,559 A | 9/1989 | Perlman | 370/60 |
| 5,079,767 A | 1/1992 | Perlman | 370/94.3 |
| 5,361,256 A * | 11/1994 | Doeringer et al. | 370/390 |
| 5,459,725 A | 10/1995 | Bodner et al. | 370/60 |
| 5,602,839 A * | 2/1997 | Annapareddy et al. | 370/405 |
| 5,959,989 A | 9/1999 | Gleeson et al. | 370/390 |
| 6,055,364 A | 4/2000 | Speakman et al. | 395/200.59 |
| 6,061,349 A * | 5/2000 | Coile et al. | 370/389 |
| 6,091,724 A | 7/2000 | Chandra et al. | 370/390 |
| 6,600,724 B1 * | 7/2003 | Cheng | 370/256 |

* cited by examiner

*Primary Examiner*—Huy D. Vu
*Assistant Examiner*—Daniel Ryman
(74) *Attorney, Agent, or Firm*—F. Chau & Associates, LLC (57) ABSTRACT

A method for the multicast distribution of a message is provided. A first real machine multicasts the message through a network of message processing machines to one or more message receiving machines, wherein the network is organized into two or more cells including machines, and wherein one or more links between cells comprise link bundles. The method includes selecting a spanning tree rooted in the cell including the first real machine, and comprised of the cells and the link bundles. The method determines one or more cells for receiving the message based on the selected spanning tree and the location of the receiving machines, and selects one or more routes from among the machines and links within the cells and link bundles to a next cell. The method further routes the message to the receiving cells in the spanning tree, and delivering the message to the receiving machines within the receiving cells.

20 Claims, 7 Drawing Sheets

| tag=[(i,D1:E:s1)] | publisher_id="c-114" | topic="weather" | body="sunny today, clear tonight, rainy tomorrow" |

Fig. 9

SYSTEM AND METHOD FOR A MULTICAST NETWORK MESSAGING SERVICE

BACKGROUND OF THE INVENTION

1. Field of the Invention

The present invention relates to the distribution of messages within a network of processors, and more particularly, to a high capacity, fault-tolerant multicast message distribution system.

2. Description of Related Art

In some multicast systems a group of recipients intended to receive a message is explicitly named in a message header as a multicast group address; in other schemes, such as publish/subscribe systems, the content of each published message is matched against the subscription specifications of each subscriber (or aggregated sets of subscribers) and the message is distributed to the subscribers having matching subscriptions.

By building such a system out of a number of computer processors and inter-processor communication facilities such as local area network adapters and electronic switching fabrics, the capacity and the fault-tolerance (reliability) of the system can be increased. Clustered systems may, in turn, be interconnected to form larger, more capable computing and messaging systems.

In the prior art, messages are multicast along paths in one or more spanning trees defined over a set of message processing computers (nodes) and communication links. The prior art deals with the problem of node or link failures by recomputing and/or rebuilding an alternative spanning tree. However, no known method exists for scaling the message throughput capacity of a network to handle varying amounts of multicast traffic by adding and subtracting additional or redundant nodes and links.

Therefore, a need exists for a system and method for defining a multicast spanning tree over a set of cells and link bundles, where each cell may include several message processing computers and each link bundle may include several communication links.

SUMMARY OF THE INVENTION

According to an embodiment of the present invention, a message processor may simultaneously reside in one or more cells. A processor residing in two cells may act as a communications gateway between the cells, thus forming a virtual link. A group of virtual and/or real communication links between two cells comprise a link bundle.

Fault-tolerance is achieved by using alternate processors within a cell and/or alternative communication links within a link bundle. To recover from a failure, it is not necessary to recompute or rebuild an entire network spanning tree. According to the present invention, failure recovery is a process local to a cell or pair of cells.

Message distribution systems organized, built, and operated according to these methods can scale message handling capacities. The message handling capacities correspond to the number of processors in the cells and the number of communication links in link bundles between cells. The size and complexity of the spanning tree(s) in such a network need not increase with each additional processor and communications link because the spanning trees are defined over the cells and link bundles, and not over the individual processors and links.

According to an embodiment of the present invention, a method for the multicast distribution of a message is provided. A first real machine multicasts the message through a network of message processing machines to one or more message receiving machines, wherein the network is organized into two or more cells including machines, and wherein one or more links between cells comprise link bundles. The method includes selecting a spanning tree rooted in the cell including the first real machine, and comprised of the cells and the link bundles. The method determines one or more cells for receiving the message based on the selected spanning tree and the location of the receiving machines, and selects one or more routes from among the machines and links within the cells and link bundles to a next cell. The method further routes the message to the receiving cells in the spanning tree, and delivering the message to the receiving machines within the receiving cells.

The method can implement one or more virtual machines within each real machine. A link is one of a virtual link between two virtual machines, and a real link between two real machines. The network's message handling capacity is scaleable.

The multicast distribution of the message is along links and further includes the step of routing the message through the selected spanning tree according to pre-computed cellule distribution tables associated with each real machine, wherein a cellule comprises one or more virtual machines within a cell at an end of a link bundle. Selecting the route further includes determining a routing choice table for each real machine.

The multicast distribution is according to the cellule distribution table and a message distribution tag including a flagged list of virtual machines. The message distribution tag can be one of compressed, factored between internal and external machines relevant to a sending real machine, and compressed and factored. The method further includes the step of determining an updated message distribution tag for the message relevant to the internal and external machines of the sending machine, wherein the sending machine can be one of the first real machine and a receiving machine for forwarding the message to one or more additional receiving machines.

The routing choice table selects machines and links according to one of random choice, round-robin least busy, least-busy, preserve message order, and preserve message order by hashing on origin identification. Determining a routing choice table further includes determining a failover route for redirecting a message. Determining a routing choice table further includes exchanging routing information included in the routing choice table of each machine upon the happening of an event. An event includes one of a machine failure and a machine recovery.

According to an embodiment of the present invention, the method steps can be performed by a program storage device readable by machine, tangibly embodying a program of instructions executable be the machine.

BRIEF DESCRIPTION OF THE DRAWINGS

Preferred embodiments of the present invention will be described below in more detail, with reference to the accompanying drawings.

DETAILED DESCRIPTION OF THE PRESENT INVENTION

According to the present invention a system and method is provided for defining a multicast spanning tree over a set of cells and link bundles, wherein each cell includes at least one message processing computer and each link bundle includes at least one communication link. Further, the present invention discloses a scaleable and available multicast network messaging service. Commonly assigned U.S. Pat. No. 6,091,724, relating generally to routing messages within a network using the data content of a message, is incorporated by reference in its entirety herein.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

The invention is presented below in three sections, I, II, and III. Section I defines an illustrative networking model used subsequently to describe the invention. Section II illustrates methods for the efficient multicast distribution of messages within a network organized along the lines of the networking model. Section III describes additional methods illustrating the operation of a network according to the present invention in terms of reliability and size.

I. The Networking Model

According to a preferred embodiment of the present invention, a method of organizing a network of message processors, and a set of corresponding communication protocols, is provided for the efficient multicast distribution of messages.

The organization and protocols presented herein are applicable to a wide range of computer and network technologies. For example, the organization and protocols are applicable in a network comprising a mix of computers and subnetworks having different capabilities and capacities. Generally, any message distribution network that can be described according to the networking model can utilize the communication protocols described herein.

The networking model is comprised of cells of communicating message processors, which communicate with one another via link bundles. The cells and link bundles form spanning trees.

A cell is a set of network-connected message processors. Each processor can directly communicate with any other processor in the same cell. Moreover, any processor within a cell can directly multicast a message to any subset of processors within the same cell. Directly multicasting includes sending multiple, identical copies of the same message to each intended recipient. This may be accomplished either by the sender repeatedly unicasting the message to each of the recipients, or by utilizing a network-provided multicast or broadcast service.

Low communication costs and high speed messaging are desirable among arbitrary pairs of processors within the same cell, although not needed for logical correctness of the protocols.

The cell concept applies and scales across a range of processor networks. For example, a cell may be comprised of: a set of message processors (all in the same rack or room) interconnected by a message switch; a set of processors connected to a common local area network (LAN); a set of processors interconnected by a metropolitan area network (MAN); and a set of processors in different cities communicating with one another over a wide area network (WAN).

A single message processor can be a member of more than one cell. For example, one processor in a rack of switch connected processors may also have a network interface that connects it to a wide area network.

A message processor can be called a server to distinguish it from a client processor machine. Messages originate at publishing client machines and are delivered to subscribing client machines. A client machine can act as a publisher, a subscriber, or both.

One or more processors in a cell C can be (configured to be) connected to one or more processors in a cell D. Messages may flow from cell C to cell D over the connections between the processors in cells C and D. The set of all connections between any two cells comprise a link bundle.

When a processor x is a member of two different cells C and D, a virtual connection may be configured between x in C and x in D. The virtual connection belongs to the link bundle between cells C and D. The inter-cellular connection between different processors is a real connection when distinguishing virtual and non-virtual connections. A link bundle can include virtual connections, real connections, or a mix of virtual and real connections.

Message processors and cells of message processors distribute messages among client processors. Clients exist in client-server cells which are different than the (server-server) cells described above. Clients connect to the servers in their client-server cell, and not to other clients or servers in other cells. However, a client is able to communicate directly with each server in the client-server cell. According to the networking model, any message processing machine can belong to one or more cells. Thus, any message processing machine can act as a client processor, a server processor, or both.

Applying graph theory to a set of cells and link bundles, consider each cell as a node of a graph. A link bundle between cells is an edge or arc of the graph. To efficiently distribute (multicast) a message among a set of cells, known methods of graph theory can be used to choose a spanning tree having a set of cells and links for achieving desired characteristics. These characteristics can include, among others, low communication costs, high speed, and reliability.

The choice of spanning tree is a global configuration choice. However, the choice of which processors within each cell, and which connection within each link bundle are used to multicast a particular message can be made locally and dynamically so as to both distribute and/or share traffic loads among the processors and connections, and tolerate processor and/or connection failures.

For example, consider a message that is to be multicast to all clients. Although the message may be sent to every cell in the network, it need not be handled by every message processor. Instead, a subset of processors and network connections can be locally and dynamically chosen so that, within each link bundle, one connection is used, and within each cell, the message need only be distributed among the processor(s) at each end of the chosen network connection. A processor that receives the message into a cell, multicasts the message within the cell to those processors that will send the message on to other cells.

A single real message processor x may be at one end (or both) of several link bundles in one or more cells. A single real message processor can implement several virtual message processors (or virtual machines), one virtual machine at each link bundle end where the real processor has a presence.

When a real machine x within cell C that has one or more connections to machines in cell D, the designation C:D:x is the virtual message processor in cell C implemented by x at the end of the link bundle connecting cell C to cell D. The set of virtual machines in cell C at the end of the link bundle connecting cell C to cell D is designated C:D. Such a set C:D is a cellule. Notice that the cellules of cell C are disjoint subsets of virtual machines and are a partitioning of the set of all virtual machines within cell C. In a special case, within a client-sever cell, each client machine is considered as implementing a single virtual machine within its own cellule.

Cellules within the same cell are internal neighbors. Cellules in different cells, connected by a link bundle are external neighbors.

According to an embodiment of the present invention, a real machine processes messages associated with each virtual machine it implements. For example, sending a message from virtual machine C:D:x to C:E:x should have near zero cost, since no actual network transmission cost is incurred to logically transfer a message between two virtual machines that are implemented by the same real machine.

The networking model provides a common framework that can be used to describe a range of network topologies and technologies, which include inter-networking via gateway machines, hierarchical network systems, backhauled inter-connects, local area networks (LANs), switches, and so forth. The following are illustrative examples of different networks according to an embodiment of the present invention.

Figure 1:
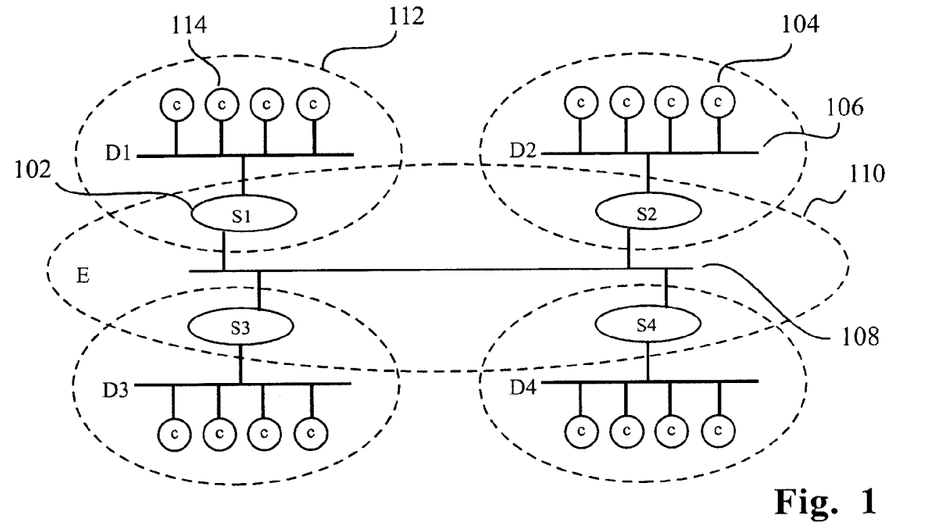
FIG. 1 is an illustrative diagram of a physical layout of a message distribution network.

Referring to FIG. 1, an illustrative view of the physical layout of a message distribution network with four servers S1, S2, S3, and S4, e.g., 102, each having four clients, c, e.g., 104. Each server is connected via a LAN, e.g., 106, to its clients. The servers are connected to each other by a LAN or switch 108. Each server-cell, e.g., D1 (112), includes at least one server, e.g., S1 (102), and the server's clients, e.g., 114. E (110) is a cell including servers, e.g., S1, S2, S3, and S4.

Figure 2:
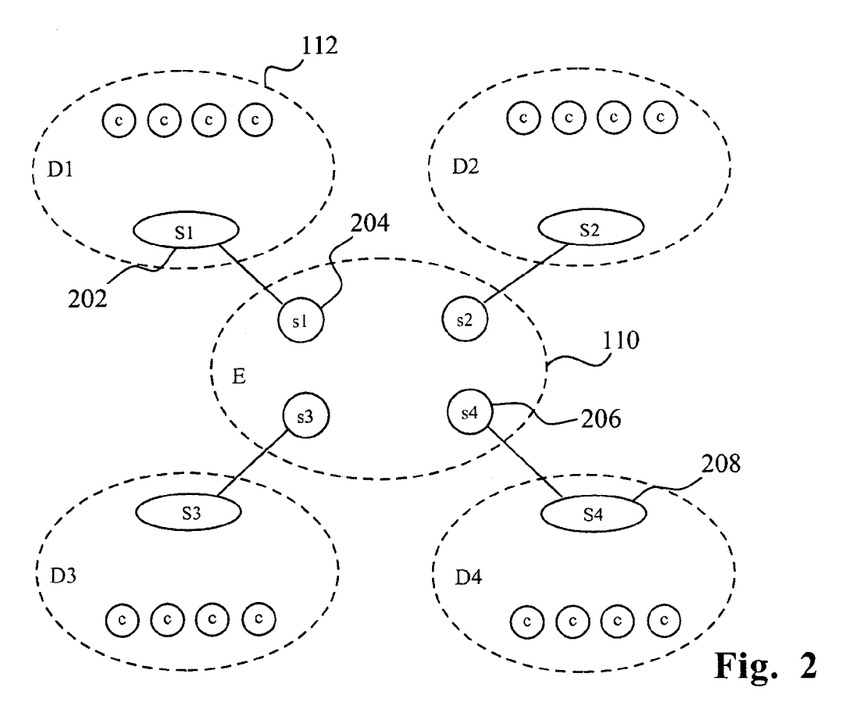
FIG. 2 is an illustrative diagram of a model network according to FIG. 1.

Referring to FIG. 2, an illustrative model view of the network in FIG. 1, each server is separated into two virtual machines. For example, D1:E:s1 (202) is a real machine in client-server cell D1 (112), it has a virtual connection to virtual machine E:D1:s1 (204) in cell E (110). Within cell E (110) messages are exchanged among the four virtual server machines E:Di:si (where i=1,2,3,4). Each virtual machine E:Di:si is the only member of its cellule E:Di. (And likewise, Di:E:si . . . Di:E.)

Figure 3:
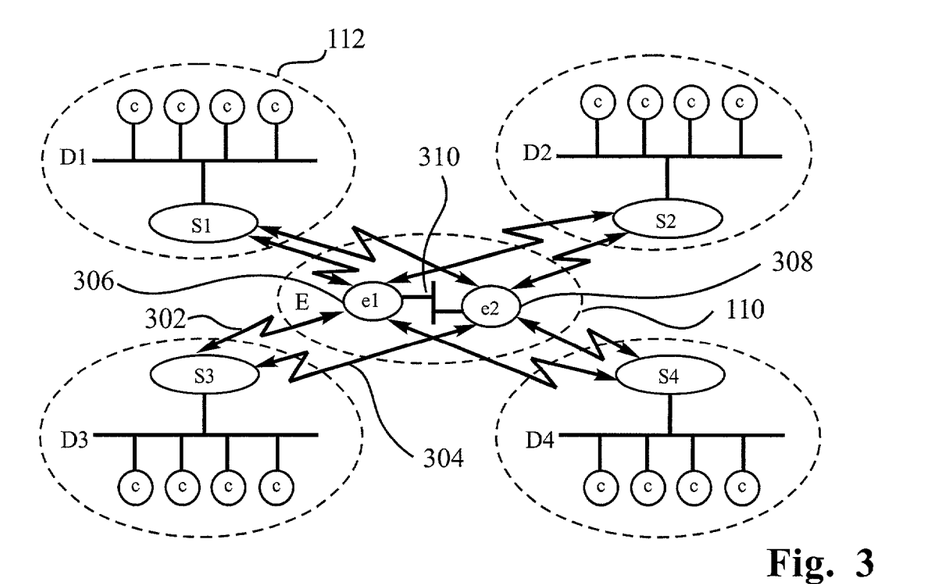
FIG. 3 is an illustrative diagram of a physical layout of another message distribution network.

Referring to FIG. 3, an illustrative view of the physical layout of a network with four servers S1, S2, S3, and S4, each having four clients, is described. Each server is LAN connected to its clients. Each server is connected via a WAN by two point-to-point links (e.g., 302 and 304) to the central enterprise servers e1 and e2 (306 and 308 respectively). D1 (112) is the server-client cell including S1 and its clients. E (110) is the cell including the enterprise servers e1 (306) and e2 (308), which are linked together by a LAN or other switching fabric 310. The dual paths (e.g., 302 and 304) from the server in each cell Di to e1 and e2 can be used for load balancing and also provide hot backups in the event of, for example, a link failure or a central server failure (of e1 or e2).

Figure 4:
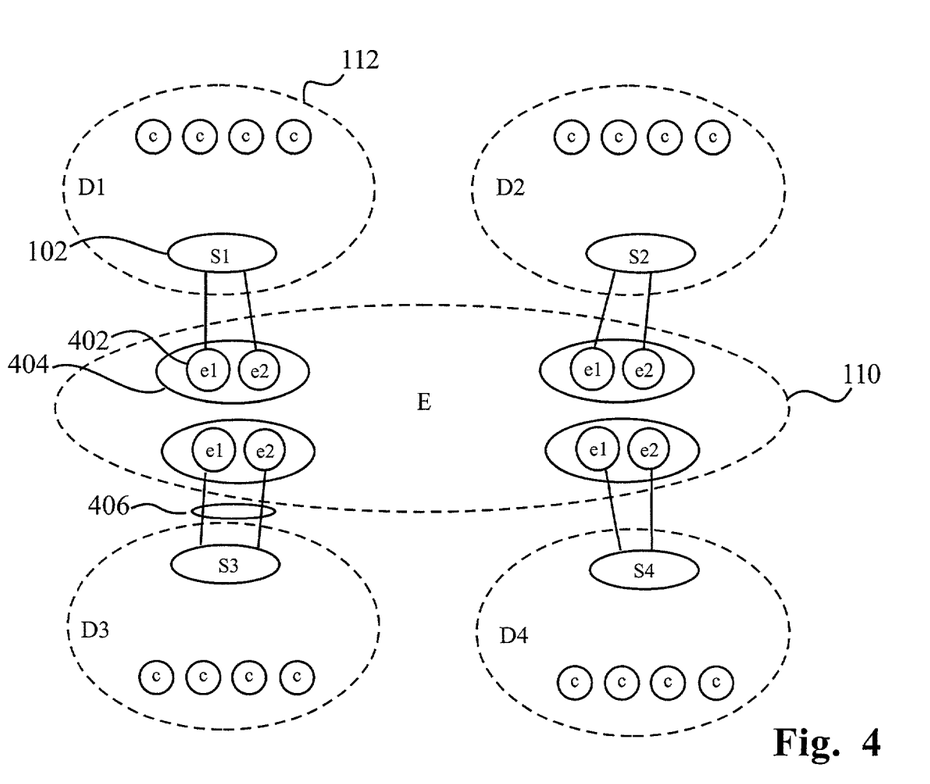
FIG. 4 is an illustrative diagram of a model network according to FIG. 3.

FIG. 4 illustrates a model of the network shown in FIG. 3. Each enterprise server, e1 and e2 (302, and 304 respectively), implements four virtual machines, e.g., 402. There are four cellules (e.g., 404) within cell E (110), one for each link bundle (e.g., 406) leading to the client-server cells D1, D2, D3, and D4. For example, E:D1:e1 (402) and E:D1:e2 form cellule E:D1 (404) having an external neighbor cellule D1:E including server S1 (102) in client-server cell D1 (112).

Figure 5:
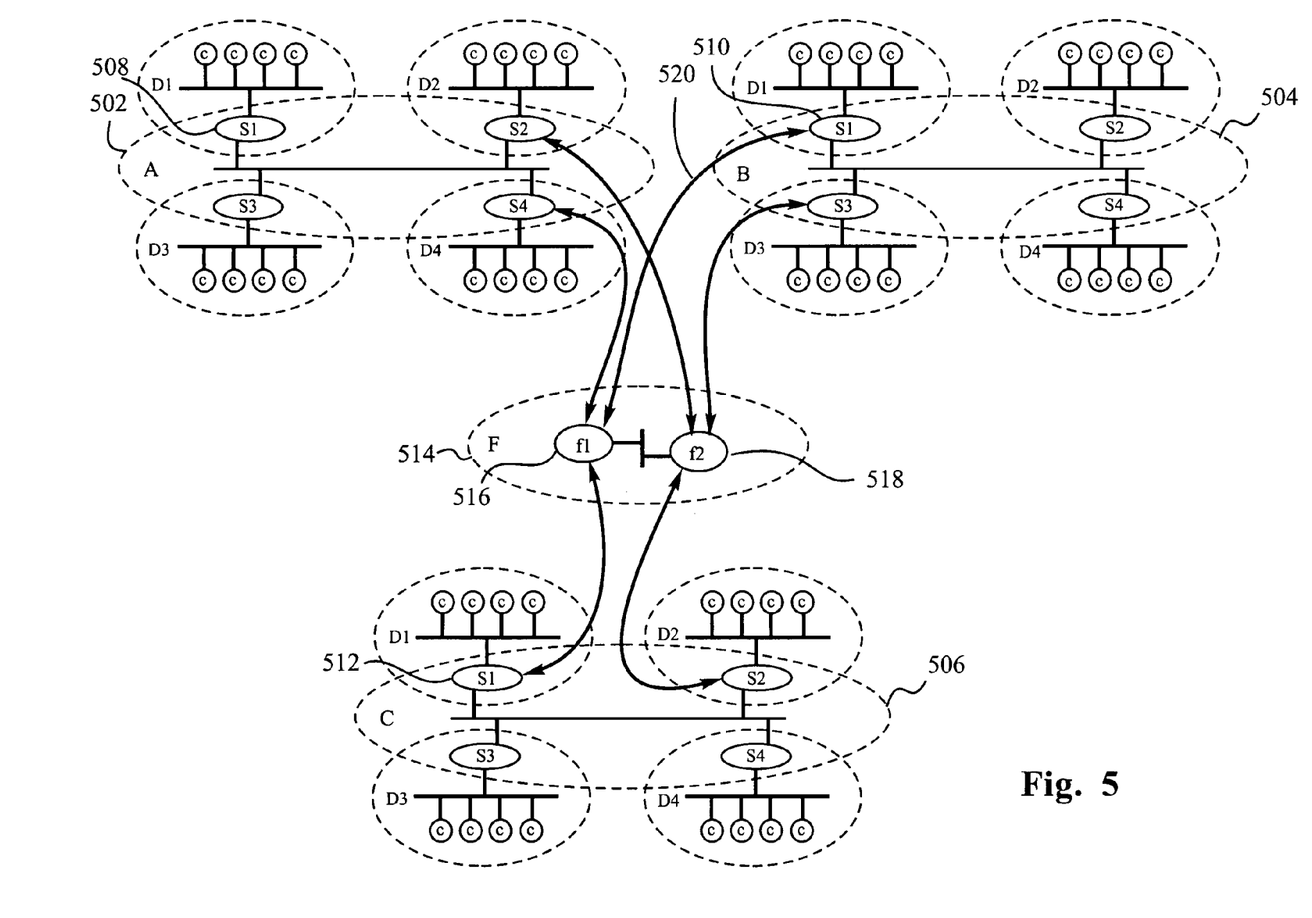
FIG. 5 is yet another illustrative diagram of a physical layout of a message distribution network.

Referring to FIG. 5, an illustrative view of the physical layout of a network having servers connected by both LAN and WAN links. Each cell A, B, and C (502, 504, and 506 respectively) has four servers, S1, S2, S3, and S4. Each server having four clients in LAN configurations, similar to FIG. 1. Thus, for any server designation Si, there are three different servers, each qualified by the names A.Si, B.Si, and C.Si. For example, for the servers designated S1, there exists server A.S1, server B.S1, and server C.S1 (508, 510, and 512 respectively). In the physical layout shown in FIG. 5, each ellipse drawn with a solid line represents a different physical machine.

Cell F (514) includes servers f1 and f2 (516 and 518 respectively), each having three WAN connections (e.g., 520), one to a server in each of cells A, B, and C. Similar to FIG. 2, there exist redundant links among the cells connected by WAN links. For example, cell A is connected to cell F by links {A.S4;f1 } and {A.S4;f2}. Should any of the eight different machines (A.S2, A.S4, B.S1, B.S3, F.f1, F.f2, C.S1, C.S2), or one of the six links (two per cell, A, B, and C) fail, the other components of the network will remain connected. FIG. 5 can also be viewed as a three tier hierarchically organized network with cell F at the top, cells A, B, and C in the middle tier, and the twelve server-client cells A.D1, A.D2, . . . , C.D4 in the lowest tier.

Figure 6:
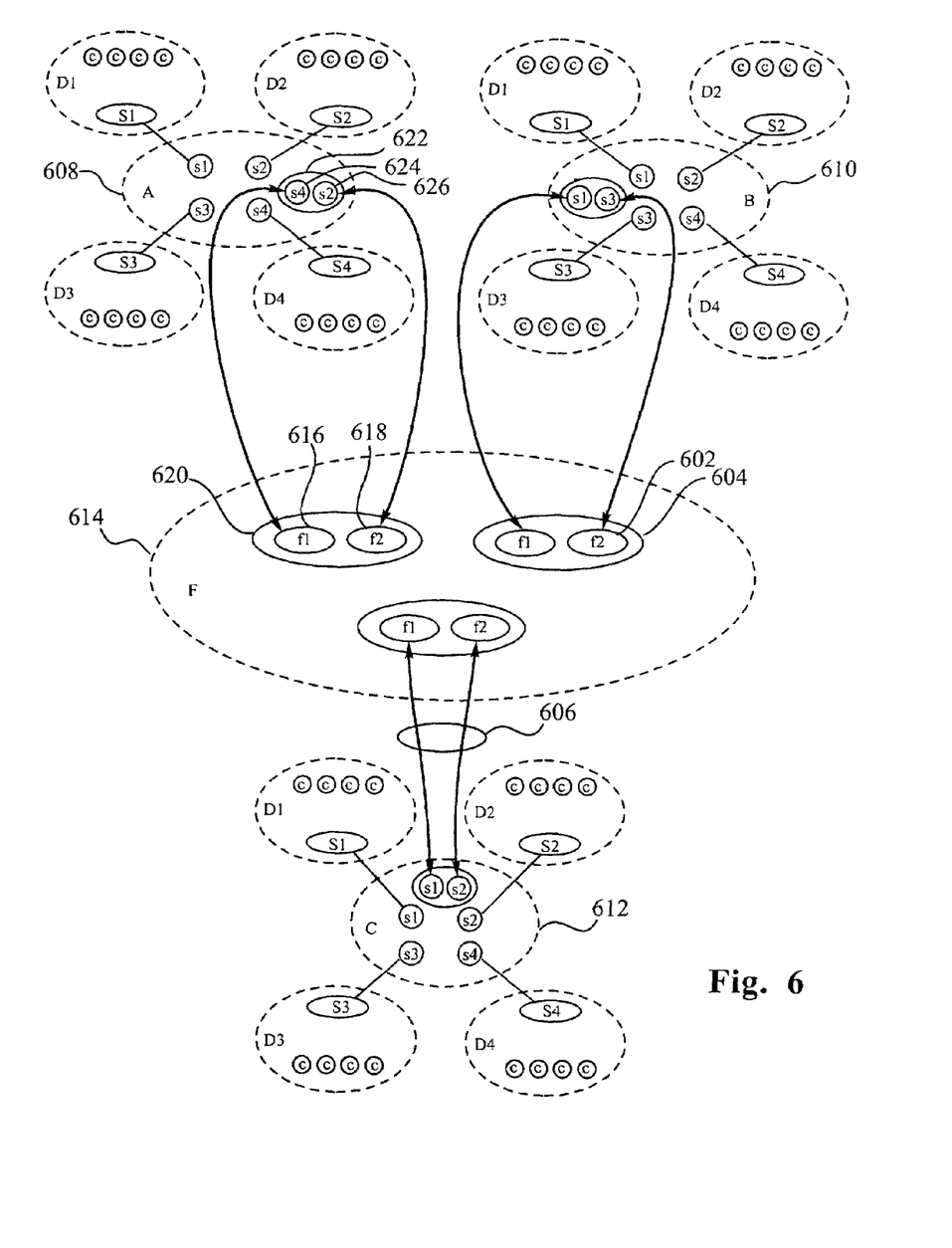
FIG. 6 is an illustrative model network according to FIG. 5.

FIG. 6 illustrates a model of the network shown in FIG. 5. The servers f1 and f2 each implement three virtual machines, e.g., 602. There are three cellules (e.g., 604) within cell F (614), one for each link bundle (e.g., 606)

leading to the second tier cells A, B, and C (608, 610, and 612 respectively). Within each of the cells, A, B, and C, two of the servers implement virtual machines (e.g., 624 and 626) with connections to cell F (614)—A.s2 and A.s4 in A; B.s1 and B.s3 in B; and C.s1 and C.s2 in C.

F:A:f1 (616) and F:A:f2 (618) comprise cellule F:A (620), having external neighbor cellule A:F (622) including (and with links to each of) virtual machines A:F:A.s4 (624) and A:F:A.s2 (626) of cell A (608).

II. Methods for Efficient Multicast Distribution of Messages

A message may be broadcast throughout the network or multicast to certain clients based on a match between the clients' subscription criteria and the message's content.

Content can include among other things, a tag, a publisher_id, a topic, and/or elements of the body of the message. Content can include any indicia of a particular message. A tag for example is a field that may be changed and/or manipulated by message processors to facilitate the routing and distribution of the message. A publisher_id can include a string of characters and/or numbers uniquely identifying the publisher or origin of the message. Other indicia would be obvious to one skilled in the art in light of the present invention.

A subscription in a system for multicasting news can include the topic field of a published message, for example, "weather", "politics", "sports", "TV", "movies", "theater", "literature", etc. A client can specify a subscription as a set of topic words. For example, referring to FIG. 1, a client c(104) only interested in messages about television or the weather can specify its subscription as {"TV", "weather"}. Another subscriber c(114) interested in television, movies, and sports can specify its subscription as {"TV", "movies", "sports"}. It may also be desirable to also allow a subscription specification of "ALL", the set of all possible topics.

The subscriptions of several clients can be aggregated into a single subscription that describes the union of all the messages that match the individual subscriptions. The aggregated subscription of c(104) and c(114) is simply the union of the sets that describe the individual subscriptions, {"TV", "weather", "movies", "sports"}. An aggregated subscription can be approximated by a subscription that matches a superset of the desired messages, the coarsest approximation being the subscription "ALL". Referring to FIG. 2, a client-server cellule, e.g., D4:E (208), advertises the aggregated subscriptions of all its clients to its neighbor cellule, e.g. E:D4 (206), so that a message processor(s) in a neighbor cellule will forward all messages that match any of the subscriptions of the clients to a server of those clients. Similarly, the aggregated subscriptions of the several cellules in a cell (or an approximation of the aggregation) is advertised to neighbor cellules in other cells.

The methods described herein apply to both broadcast and multicast; broadcast is a special case of multicast where all clients have subscribed to all messages, regardless of content.

An embodiment of the present invention will now be described according to the following method; for a message m multicast from a publishing client to one or more subscribing clients, the publishing client sends m to a server s in its client-server cell S. Server s sends m to every subscribing client in S, provided those clients have subscriptions that match the content of m. A spanning tree T, one of possibly several spanning trees, that covers the entire network of cells is selected, for example, based on the content or properties of m. Client-server cell S must be a leaf in the selected spanning tree T. Assume S connects to a cell C via a link-bundle in tree T. The (virtual) message processor implemented by s in cell S forwards m across a connection within the link-bundle to some virtual machine C:S:q in cell C, provided that the m matches the externally advertised subscription of cellule C:S.

A cellule X:Y in cell X has exactly one external neighbor cellule Y:X in cell Y. Any other cellules X:Z1, X:Z2, . . . in cell X are called internal neighbors of cellule X:Y. The message processors of each cellule share or advertise (aggregated) subscription information with the message processors of neighboring cellules as follows. In an operational multicast network, each cellule X:Y has an externally advertised subscription (relative to the spanning tree T) which represents the aggregated subscriptions of all clients that, were the spanning tree divided into two parts on the edge between X and Y, would be in part X. For any two cells connected by an edge of spanning tree T, the internally advertised subscription of Y:X relative to T is defined as equal to the externally advertised subscription of X:Y relative to T.

Within and among server cells the multicast of message m continues by repeatedly applying the following method:

1. When message m is received by virtual message processor X:Y:q, coming across a connection in the link bundle from an external neighbor in Y:X, then X:Y:q forwards m to (a virtual message processor in) each of its internally neighboring cellules X:Zj, provided that m matches the internally advertised subscription of X:Zj, for each cellule X:Zj in cell X that is not X:Y and for which there is a link bundle between X and Zj that is an edge of the spanning tree T.
2. When message m is received by virtual message processor X:W:p, coming from an internal neighbor in the same cell, then X:W:p forwards m to (a virtual message processor in) its externally neighboring cellule W:X, provided that m matches the externally advertised subscription of W:X. W may be a client-server cell or another server cell.

Whenever message m is received by a virtual message processor Q:X:q within a client-server cell Q, Q:X:q sends m to the subscribing clients in client server cell Q, provided those clients have subscriptions that match the content of m.

For the implementation of a multicast by real message processing machines, a single real message processing machine may implement several virtual machines, each in different cellules. Considering how messages are processed, arriving on one real network connection, and are sent out on some set of network connections, the present invention need not go through all the motions implied by the cellular networking model.

In particular, all the subscriptions managed by the virtual machines implemented by a real machine M can be combined into a single searchable data structure, such as a search tree. Matching a message against all the subscriptions managed by the real machine M will yield the names of any cellules to which the message should be forwarded. M need not send messages to the virtual machine(s) that it implements. Rather, M excludes the subscriptions of cellules in which it implements a virtual machine from its message to subscription matching processing and data structures. Further, a message destined for several virtual machines implemented by the same real machine should be sent to that machine only once.

Figure 7:
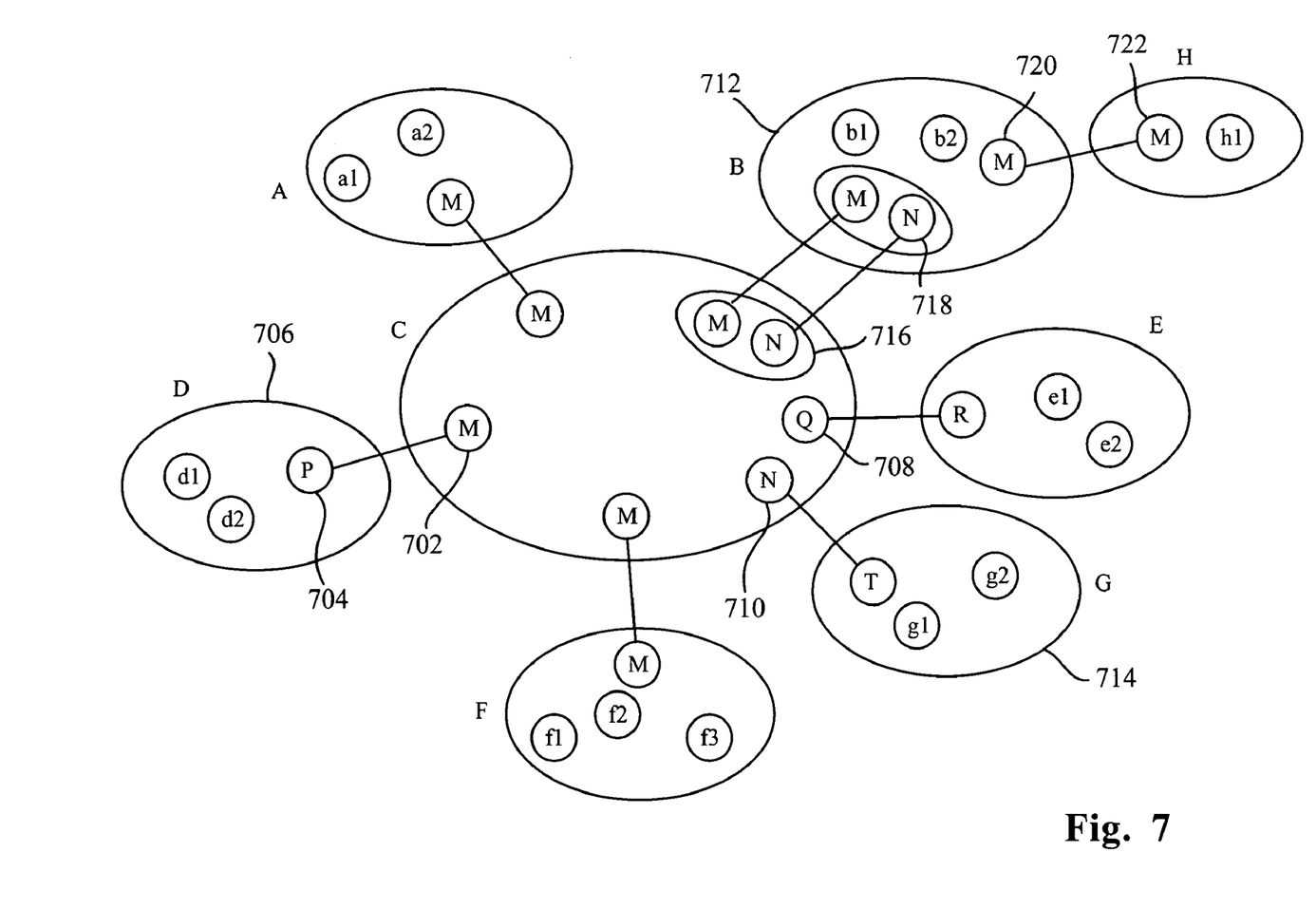
FIG. 7 is an illustrative model network according to a preferred embodiment of the present invention.

The implementation of a multicast by a real message processing machine according to the present invention needs to handle a variety of network scenarios. Referring to FIG. 7, where real machine M resides in cells A, B, C, F, and H, as the basis for the following illustrative examples, in one case where a message is received by M (702) from machine P (704) in cell D (706), and M does not also reside in D, the present invention does not send the message back to D:C:P (nor to any machine in D), even if cellule D:C has a matching (externally advertised) subscription. In this case the present invention needs to check the results of the matching subscriber's cellule to determine whether it is in cell D (706), and therefore skip any associated send. The message would be sent to machines a1, a2, b1, b2, h1, Q, C:G:N, f1, f2, and f3, assuming it matched the subscriptions of the corresponding cellules.

In another case where a message is received by M from an internal neighbor C:E:Q (708), and M also resides in C (where it implements four virtual machines). The invention does not send the message to any other virtual machines in C, even if their cellules have matching subscriptions, because C:E:Q (708) has already done so according to the network model multicasting rules given above. FIG. 7 shows that Q (708) would send to M and C:G:N (710), assuming the existence of matching subscriptions. Therefore, M need not send to C:E:Q (708), nor should it send to C:G:N (710). M would send to a1, a2, b1, b2, h1, f1, f2, B3, and P, assuming the existence of matching subscriptions. Further, Q (708) needs to send one copy of the message to machine M. By sending a copy to M, Q need not send a separate copy to each of the virtual machines C:A:M, C:B:M, C:F:M, and C:D:M.

In still another example, suppose again that a message received by M comes from C:E:Q (708), but that C:E:Q (708) has chosen (via its routing function) to send the message to virtual machines C:B:N, C:G:N, C:A:M, C:D:M, and C:F:M. That is, Q (708) routes to cells B (712) and G (714) via machine N (710 and 716); and to cells A, D, F, via M. In this case, Q (708) needs to send a single copy of the message to M. M then distributes the message to a1, a2, d1, d2, f1, f2, and f3, assuming the existence of matching subscriptions. Because N distributes to b1 and b2, M should not distribute the message to b1 or b2, nor directly to h1. Virtual machine C:B:N (716) sends the message to B:C:N (718) which distributes it to b1, b2, and B:H:M (720) in cell B, assuming the existence of matching subscriptions. Thus, M has received the message twice. However, M has received the message acting as virtual machine B:H:M (720). B:H:M (720) should pass the message to H:B:M (722) in cell H. H:B:M (722) then sends the message to h1, assuming the existence of matching subscriptions.

In one embodiment of the present invention, where one real machine exists in multiple cellules, the machine can efficiently distribute messages in a way that follows the model of virtual machines, but avoids sending messages among virtual machines that are implemented by the same real machine.

Each real machine may represent multiple virtual machines in one or more cells and cellules. When a message is sent from one real machine N to another machine M, the message should be tagged with a list of the virtual machines that are the intended recipients. The tag may also include an indicator of whether the message should be treated as coming from an internal or external neighbor, from a virtual machine in the same cell or from a virtual machine at the other end of a link-bundle, relative to the intended recipient virtual machine.

Referring again to FIG. 7, consider machine Q (708) sending a message to M with tag [(i,C:A:M),(i,C:D:M),(i,C:F:M)]; Q sending to N with tag [(i,C:B:N),(i,C:G:N)]; and N sending to M with tag [(i,B:H:M)]. In this illustrative example of message distribution tags, "i" designates internal, and "x" designates external.

According to an embodiment of the present invention, each machine has a cellule distribution table. A cellule distribution table lists all of the cellule-to-cellule connections implemented by a real machine. A cellule X:Y is a reachable foreign cellule with respect to machine N, if N does not implement a virtual machine in X:Y, but for some real machine x, X:Y:x is either an internal neighbor of some virtual machine X:V:N, or N is in cell Y, and X:Y:x is an external neighbor of a virtual machine Y:X:N. Similarly, a virtual machine X:Y:x is a reachable foreign virtual machine with respect to machine N, if N does not implement a virtual machine in X:Y, but for some real machine x, X:Y:x is either an internal neighbor of some virtual machine X:V:N, or N is in cell Y, and X:Y:x is an external neighbor of a virtual machine Y:X:N. (X:Y:x and Y:X:N are external neighbors when there is a configured connection between X:Y:x and Y:X:N within a link bundle between X and Y within a multicast spanning tree.)

For each virtual machine V:W:N, represented by a machine N, the machine keeps two lists (for each multicast spanning tree), the lists can be computed during a configuration process. For any message arriving from within the same cell V (internal neighbors), the first list includes all reachable foreign cellules to which the message should be redistributed, assuming the existence of matching subscriptions for those cellules. For any message arriving from external neighbor W:V, the second list includes all reachable foreign cellules to which the message should be redistributed, assuming the existence of matching subscriptions.

For example, referring to FIG. 7, a cellule distribution table (CDT) for machine N will include the following:

| virtual machine | from same cell (internal) distribute to | from external neighbor distribute to |
| --- | --- | --- |
| C:B:N | b1, b2, B:H | C:A, C:D, C:F, G:C, C:E |
| C:G:N | G:C | C:A, C:D, C:F, C:E, b1, b2, B:H |
| B:C:N | C:A, C:D, C:F, G:C, C:E | b1, b2, B:H |

(In this example, consider b1 and b2 to be cellules.)

By restricting a network configuration so that for each real machine q, all the virtual machines implemented by q form a connected set of virtual machines, the set of all reachable foreign cellules is the same for all virtual machines implemented by q. The present invention defines a set of virtual machines to be connected if a message could be broadcast from any virtual machine in the set to all other virtual machines in the set using only the configured network connections and/or intracellular communication among the virtual machines in the set.

Further, when all the virtual machines of N form a connected set, the two distribution lists (internal and external) for each virtual machine V:W:N are given by a partitioning of the set of foreign cellules of N into two disjoint sets: those that are reached by messages arriving from an internal neighbor of V:W:N and going on towards cellule W:V; and those arriving at V:W:N from cellule W:V and going on to all the internally neighboring cellules within cell V.

Figure 8:
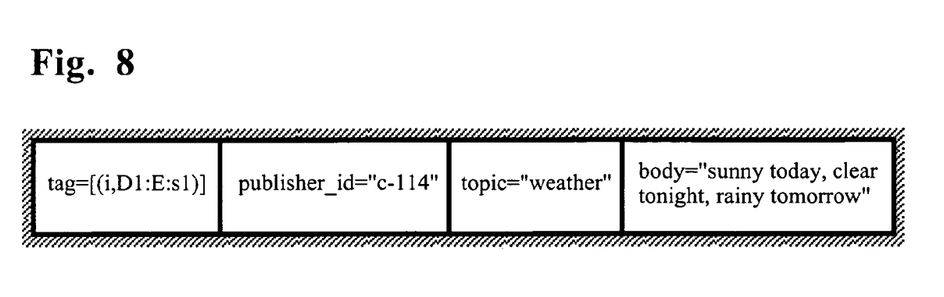
FIG. 8 is an illustrative diagram of a message according to a preferred embodiment of the present invention.

According to an embodiment of the present invention, a method is provided for multicast-distributing each message arriving at machine N. To begin the process of multicasting a message m, the client-publisher of m chooses a server machine N in a client-server cellule X:Y, sets the message distribution tag of m to [i,(X:Y:N)], and sends the message to machine N. FIG. 8 shows the tag value [(i,D1:E:s1)] that is used by client c(114) in FIGS. 1 and 2.

When a message arrives at a machine N, its message distribution tag [(flag, to): (f1,X1:Y1:N), (f2,X2:Y2:N), ..., (fk,Xk:Yk:N)] is processed in conjunction with the aforementioned cellule distribution table to produce a new potential to-list (LA). The method initializes LA to an empty list of cellules. For each (flag, to) entry (fk,Xk:Yk:N) in the tag of the incoming message: use from flag fk to determine whether the message came from an internal or an external neighbor of Xk:Yk:N; find the corresponding distribution sublist of cellules for Xk:Yk:N in the cellule distribution table of N; and append this sub-list to LA. The resulting list LA is a complete list of cellules to which the message should be distributed, assuming matching subscriptions. The message is matched against the subscriptions of all reachable foreign cellules of N, but only cellules which both match and are in the potential to-list (LA) go into the pruned matching results list (LB). For each cellule in list LB, choose a virtual machine within that cellule to which N has a network or intracellular connection. A routing function may be used to choose the virtual machine. The result is a list of destination virtual machines for the message (LC). Sort and split list LC into a set of lists {LD 1, LD2,...} so that all the virtual machines within each list LDj are implemented by the same real machine. For each list LDj=(W1:V1:Mj, W2:V2:Mj, ..., W1:V1:Mj): expand the list to form a message distribution tag LTj=[(from,to): (g1,W1:V1:Mj), (g2,W2:V2:Mj), ..., (g1 ,W1:V1:Mj)] where for each i flag gi is set to a value "i" (internal) if machine N has a presence in cell Wi; gi is set to a value "x" (external) otherwise; and send the message to machine Mj along with message distribution tag LTj. Alternatively, send the message (perhaps using a network multicast or broadcast facility) to all the real machines implied by the list LC, with a tag which is the concatenation of all the tags LTj computed as described above. Upon receipt a real machine ignores virtual machines named in the tag that it does not implement.

In one embodiment of the present invention, compressed message distribution tags can be implemented. There are many ways the message distribution tags can be compressed using well known techniques. The present invention presents preferred techniques.

According to an embodiment of the present invention, a compressed designation may be implemented. A notation such as {C:A:M, C:D:M, C:F:M, G:C:T, C:E:Q} describes a set of virtual machines within a network, in a readable form. A corresponding compressed notation of the set of virtual machines can reduce message space overhead and/or facilitate fast processing of the lists by message processing machines (as may be implemented by computer).

Within each cell, each virtual machine is uniquely numbered, starting with 0 and counting up. In a client-server cell, the lowest numbers 0, 1, 2, 3, ... can be reserved for the server (virtual) machines, while using higher numbers for the client machines. For example, number C:A:M as virtual machine 0 in cell C; C:B:M as 1; C:B:N as 2; C:E:Q as 3; and so on proceeding clockwise around C in FIG. 7. Such a numbering scheme may be assigned statically when the network is configured, or dynamically by a protocol conducted among all the machines within a cell.

Any individual virtual machine within the network may be identified by cell_name.vm_number. Any subset of virtual machines within the same cell can be identified by a cell name and a bit vector, cell_name#vm_bit_vector, where vm_bit_vector is a bit vector with a 1 in position j if and only if virtual machine number j is in the subset (and 0 otherwise). To facilitate the use of a short bit vector to identify a subset of servers within a client-server cell, "trailing" 0's may be omitted from the bit vector. Thus, it may be desirable to reserve the lowest numbers for the servers within client-sever cells.

A set of virtual machines from different cells may be denoted as a list including individual virtual machine identifiers and/or subset-within-the-same-cell identifiers. For example, the set {C:A:M, C:D:M, C:F:M, G:C:T, C:E:Q} of virtual machines may be rewritten using the compressed notation for message distribution tags as {C#1001011,G.0}. Note that while having written the bit string 1001011 as 7 characters, in an implementation it would be represented by just 7 bits. While the methods and examples described herein have dealt with relatively small messaging networks, the methods according to the present invention are scaleable to larger installations are contemplated by the present invention.

The present invention also contemplates factored message distribution tags. Recall that a message destined for several virtual machines carries a message destination tag which can be written in the form [(f1,X1:Y1:N1), (f2,X2:Y2:N2), ..., (fk,Xk:Yk:Nk)], where each flag, fi, is a bit indicating either a cell-wise internal message transfer or an external message. Such a message destination tag can be factored and compressed as follows:

1) Partition the message distribution tag list into two lists: the list of virtual machines with internal flags, and the list of virtual machines flagged external; 2) Within each of the internal and external sub-lists, sort by cell and combine subsets of virtual machines within the same cell to exploit the more compact cell_identifier#vm_bit_vector representation for a subset of a virtual machines within the same cell; and 3) Write the factored and compressed tag list as [i(nternal): {Z1#V1,Z2#V2, . . .} (e)x(ternal): {W1.m1, W2.m2, . . .}].

Note that it is possible that the internal list may include single machines of the form Zi.mj. Any machine Zi.mj can be represented using bit vector Zi#vj, where vj has a single 1 bit in position mj. In practice, when used for a multicast algorithm, the external list will normally include only single machines. Assuming a single machine exists in only a few cells and is configured to connect to only a few machines in external cells, a message distribution tag should contain a few Zi#Vi elements and a few Wi.mi elements. A copy of a message need only carry the subset of the message distribution tag-list that is relevant to the potential receivers. (Relevant means the tag list names virtual machine(s) implemented by the receiver.) For example, if the copy is being sent to machine W1.m1, then the only part of the tag that is relevant is the part that names W1.m1, unless a configuration where the real machine that implements W1.m1 also implements W2.m2. Even in that case, the invention can either send one copy of the message with the tag x:W1.m1 and another with the tag x:W2.m2, or send just one copy with the tag x:{W1.m1, W2.m2}. A machine receiving a message with no relevant virtual machine(s) in the tag discards the message. For example, this may occur when one machine uses LAN broadcast/multicast to simultaneously send copies of a message to LAN connected brokers. The internal and external lists can be sorted by cell name; this can be used to facilitate rapid lookup in the receiving machine's cellule distribution table.

The notation [i: {Z1#V1,Z2#V2, . . .} x:{W1.m1, W2.m2, . . . }] is another illustrative syntax to explain the technique of representing a set of virtual machines using bit vectors and small integers. In a working implementation, a computer would be programmed to use a bit and byte oriented data structure, where much of the punctuation ([{#,}]) could be omitted.

Each real machine N will know the complete set of virtual machines that it implements. Call this the vm_set of N. When a message m is received, m's message distribution tag can be tested by logically intersecting it with N's vm_set. If the intersection is empty, the message may be discarded. This may happen when, for example, an approximate or covering LAN broadcast-multicast of a message hits a machine. If the intersection is not-empty, then N will continue to process, match, and forward the message according to our multicast distribution algorithm and protocol.

III. Methods for Scaleable and Robust Multicast Message Routing

According to an embodiment of the present invention, a network's capacity to handle greater message traffic volumes and rates can be increased by adding message processing machines and communications links. Improvements in processor and link capacity and speeds may be exploited, but are not necessary. Networks implementing the present invention are also robust (or fault tolerant) and are able to adapt to, and route around, processor and/or network failures.

According to an embodiment of the present invention, routing choice methods may be used to implement routing functions used by a machine N to select suitable virtual machines in neighboring cellules. The routing choice methods use a data structure called a routing choice table. Each real machine N maintains a routing choice table. The routing choice table includes a number of rows, preferably of three kinds: internal; external; and failover.

Within the row for each (foreign) internal neighboring cellule of N, labeled with the name of a cellule, e.g., C:A, each row includes a list of virtual machine numbers. Each number represents a virtual machine (in the same cell as the named cellule) that is a potential internal routing choice. For example, if row C:A includes the list [2,3,5], then virtual machines C.2, C.3, and C.5 are potential routing choices in cellule C:A. Since machine N is in cell C, it is able to send messages to any of these virtual machines by direct intracellular communication to the hosting real machines.

Within the row for each (foreign) externally neighboring cellule of N, labeled with the name of a cellule, e.g., X:C, the row includes a list of virtual machine numbers. Each number represents a virtual machine (in the cell of the named cellule) that is a potential external routing choice. For example, if row X:C includes the list [1,2] then virtual machines X.1 and X.2 are potential routing choices in cellule X:C. Machine N can have a configured network connection to the real machines that host each of these virtual machines.

For each external row, labeled with cellule name X:C, there is a corresponding row for the dual of each (foreign) externally neighboring cellule of N, labeled with the cellule name C:X. Each row includes a list of virtual machine numbers. Each number represents a virtual machine (in the cell of the named cellule) that is a potential failover routing choice. For example, if row C:X includes the list [1,4] then virtual machines C.1 and C.4 are potential failover routing choices in cellule C:X. Machine N is also in cellule C:X. The failover routing choices can be used when N has a message to send to cellule X:C, but N's configured intercellular network connections to cellule X:C have failed. In this case N will forward the message another machine in cellule C:X, which has at least one working inter-cellular network connection to cellule X:C.

Figure 9:
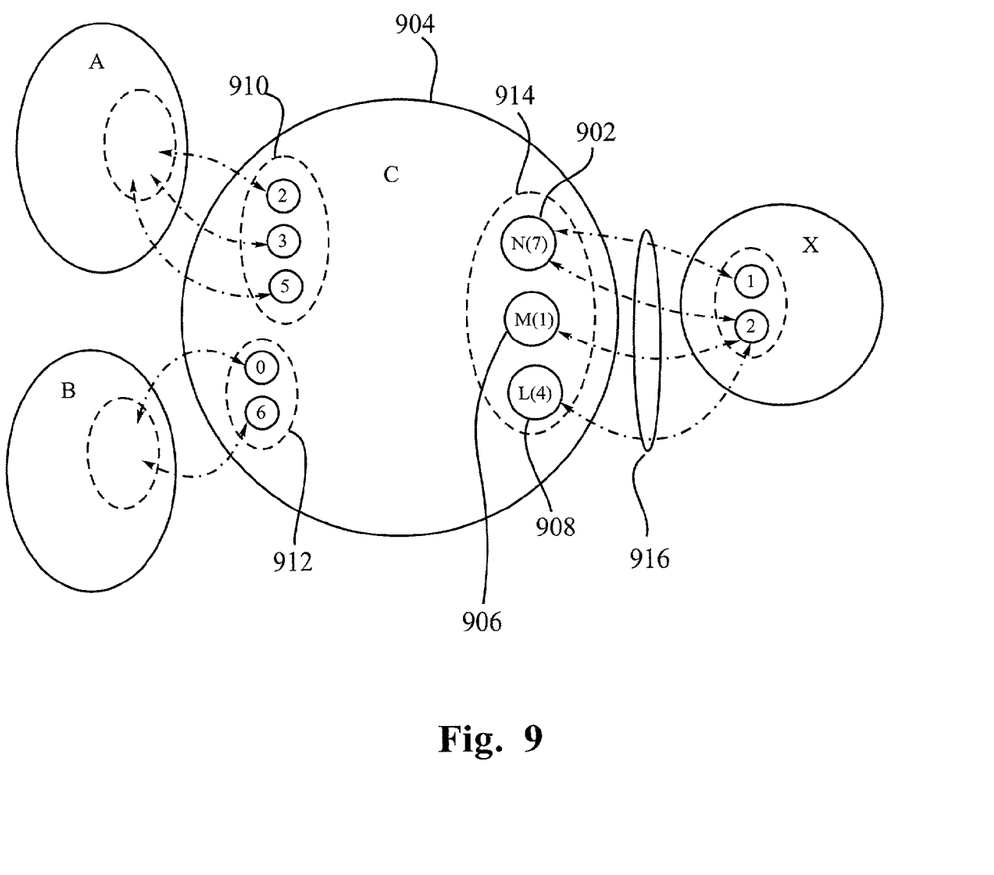
FIG. 9 is an illustration of a partial of a network corresponding to a routing choice table.

FIG. 9 gives a partial view of a network with cells A, B, C and X, to illustrate the routing choice table of real machine N. Real machine N implements virtual machine C:X:N (902) which is given virtual machine number 7 within cell C (904); so C:X:N (902) is C.7. Similarly C:X:M (906) is C.1; and C:X:L (908) is C.4. The figure also shows virtual machines C.2, C.3, C.5 in cellule C:A (910); C.0, C.6 in cellule C:B (912); and X.1, X.2 in X:C (914). FIG. 9 also shows the link bundles between the C and its neighboring cells A, B, and X, e.g., (916).

| Cellule | VM numbers |
|---------|------------|
| C:A     | 2, 3, 5    |
| C:B     | 0, 6       |
| X:C     | 1, 2       |
| C:X     | 1, 4       |

Within a network model (FIG. 9), one way to scale the network to handle increased message traffic volumes and rates is to add message processors to some or all of the cells and to configure additional inter-cellular connections between message processors in neighboring cells. When a network is scaled in this way, the number of cells may remain the same. Therefore, the size and complexity of the spanning trees also remains the same, and the number of hops taken or the number of links traversed to deliver a message to a set of clients over the spanning tree likewise remains the same. Instead, the number of links within corresponding link bundles that form the edges of the spanning tree(s) is increased as additional inter-cellular connections are added.

Such an increase is manifested in the data structures that control multicast message distribution. The cellule distribution tables (CDTs) of each machine remain about the same size, because the spanning tree(s) remains the same. Each real machine implements a CDT for each configured spanning tree. The size of each CDT depends on which cells the machine exists in, as well as the spanning tree configuration. In addition, the number of rows in the routing choice table of each machine remains the same. However, the list of virtual machine numbers in each row increases (linearly) as machines are added to each cell and inter-cellular network connections are configured.

The routing choice tables also facilitate load balancing by having each message processor dynamically choose among the different virtual machine numbers. Therefore, incoming messages bound towards a given cellule are distributed among the multiple message processors that implement the virtual machines of that cellule, exploiting either multiple inter-cellular network connections or intracellular networking facilities. Several methods and variations thereupon can be used to make a dynamic routing choice. The method used in a given implementation may depend on the desired message traffic properties.

A message processor can determine which cellule(s) a message should be forwarded to. For each incoming message that is to be forwarded to cellule W:Z, find the row labeled W:Z in the message processor's routing choice table, and let the virtual machine numbers list for this row be [i1,i2, . . . , ik] (k choices).

Choose one of the k numbers using one of these preferred variations:

A. Make an unbiased random choice. Assuming, all links and processors are about equal among the k choices, this can spread the traffic evenly.

B. Choose on a round-robin basis. If the previous choice, within the same row of the same routing choice table, was entry ij, then select ij+1 (selecting i1 after ik). This is similar to the previous variation, but keeps a last choice variable for each row in the routing choice table, indicating the ij entry.

C. Make a choice biased toward the least busy connection or processor. Thus, the network and processor utilization information is needed. This information can be fed back and/or shared among connected processors.

Some implementations of the present invention may need messages to be delivered in the publisher's order. If a particular publishing client first sends message m1 and then message m2, then no client should receive message m2 before m1. Assuming that all processor-to-processor communication channels are handled on a first-in-first-out (FIFO) basis, and that each message carries its publisher's identity, routing choices can be implemented to preserve the publisher's order, by ensuring that for each publisher p, the same routing choice is made for each message from p. For example, if a message is from publisher p, and this is the first time this message processor is sending a message from p to cellule W:Z, then choose a virtual machine number, using some technique, for example, variation A, B, or C above. Record the choice in an extension to the routing choice table. Otherwise, use the same choice as the last message from p, found in the extension to the routing choice table. Another example can include, using a hash function to map the publisher identification to a number j in the range 1 ... k and then choosing the j'th routing choice, ij, from the row of the routing choice table labeled W:Z. This is practical for any number of publishers, it needs no additional storage or extensions to the routing choice table. The hash function may be biased to favor higher capacity network connections and/or processors.

The routing choice tables, when used in a network configured with large link bundles can facilitate robust, highly available network services. For example, each message processing machine N dynamically maintains a routing choice table by monitoring connectivity to machines with which it is configured to co-reside in one or more cells and with machines with which it has inter-cellular connections that are part of link-bundles.

When N is unable to communicate with a machine Q, N marks all the virtual machines in its routing choice table which are implemented by Q as unavailable, they are logically removed from the lists of virtual machine numbers in the appropriate rows of the routing choice table.

When N and Q (re-)establish communications and can exchange messages, N marks all the virtual machines in its routing choice table which are implemented by Q as available, they are logically added to the lists of virtual machines numbers in the appropriate rows of the routing choice table.

With the routing choice tables maintained this way, multicast messages can correctly propagate cellule-to-cellule throughout the network spanning tree, even if some machines or communications facilities fail, as long as there is at least one pair of communicating machines between each pair of neighboring cellules. However, there are a few additional rules and protocols, used to make routing even more robust.

Failover routing for example, includes a redirect rule. When a message should be sent from virtual machine C:X:N to a (virtual) machine in an externally neighboring cellule X:C, but the row for X:C in the routing choice table has an empty list of virtual machine numbers (because machine N has lost all of its inter-cellular network connections to machines in the external neighboring cell(ule)), N may still be able to cause the message to be properly delivered by passing it to another virtual machine in cellule C:X, for example, C:X:M. If M has a working inter-cellular network connection (from cellule C:X to X:C), M can send the message to a (virtual) machine in cellule X:C. For this purpose, N maintains the failover routing choice rows of its routing choice table. In particular, when the virtual-machine-numbers-list of an external routing choice row X:C is empty, the message is redirected to an available virtual machine C:X:M, listed in the failover choice row C:X, assuming that is not also empty.

The redirected message is tagged with [i(nternal): {C:X:M}], so that C:X:M will treat the message as if it had come from any other internal neighbor and send the message to a machine in external neighboring cellule X:C.

In a situation where the (virtual) machine C:X:M to which the message is redirected by failover routing has lost connectivity to the external neighbor, it may re-re-direct the message back to C:X:N, forming a routing loop. According to an embodiment of the present invention, routing loops can be prevented using a hop-counter field in each message, limiting the number of times a message is delivered to a particular machine.

Another method of robust or reliable routing can include the exchange of information between machines within the same cellule, and preferably within the same cell. The information exchange via a virtual machine status exchange (VMX) protocol can update routing choice tables among machines. According to an embodiment of the present invention, under a VMX protocol, when a (real) machine M in cell C, configured to have a network connection to one or more machines in cell X, is unable to communicate with any machine in cell X, then machine M's implementation of virtual machine C:X:M becomes useless. That is, any message received by M with the tag [i:{C:X:M}] cannot be forwarded directly to a machine in cell X. Instead, M must attempt to use failover routing. When M (re-)establishes communications to at least one machine in cell X, C:X:M becomes useful again.

The VMX protocol can be used as an alternative, or in addition to failover routing. Since M monitors the status of all its inter-cellular network connections it can maintain a list of its useless virtual machines. Whenever M's list of useless virtual machines changes (some virtual machine of M becomes useful or useless), M sends its list of useless virtual machines to each real machine with which it has established an intracellular connection.

For example, the VMX protocol message may be of the form: [VMX_from: M, {C:X1, C:X2, ... , D:Y1, D:Y2, ... }], indicating that virtual machines C:X1:M, C:X2:M, ..., D:Y1:M, D:Y2:M, ... are useless. The message also implies that all other virtual machines implemented by M are useful. Alternatively, the VMX protocol message can convey the set of useless virtual machines using our more compact cell_name#vm_bit_vector representation, e.g., [VMX_from: M, C#001001, ... , D#1101100111001]. The invention can also define the VMX message to list only the useful virtual machines. Since VMX messages are always intracellular, they can be sent using an intracellular broadcast facility, if that is available. Whenever two machines in the same cell (re-)establish intracellular communications, they exchange VMX protocol messages. This happens, for example, whenever a machine is (re)booted. Whenever a machine N receives a VMX protocol message from a machine M, N updates its routing choice table. For example, the virtual machines implemented by M in the routing choice table of N are marked as available except those that the VMX protocol message from M indicates are useless. By exchanging and processing VMX protocol messages, the machines within a cell eliminate useless routing choices from their routing choice tables, thus, avoiding failover routing.

Alternatively, an implementation might choose to only exchange VMX protocol messages among machines that reside in the same cellule. That would require less resources and avoid routing loops. The intracellular messages from other cellules would be subject to failover routing.

In any case an implementation may implement failover routing to robustly handle messages that might arrive at a virtual machine that has just become useless, but whose intracellular neighbors have not yet processed the VMX protocol message that announces that uselessness.

Having described embodiments of a system and method for a multicast network messaging service, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. A method for the multicast distribution of a message from a first real machine through a network of message processing machines to one or more message receiving machines, wherein the network is organized into two or more cells including machines, and wherein one or more links between cells comprise link bundles, the method comprising the steps of:
    selecting a spanning tree rooted in the cell containing the first real machine, and comprised of the cells and the link bundles;
    determining one or more receiving cells including a message receiving machine on the selected spanning tree;
    selecting a cellule in each of the one or more receiving cells to receive the message, wherein each cellule comprises a set of one or more virtual machines within a cell at an end of a link bundle;
    selecting a route to each selected cellule from a routing choice table of the first real machine including potential routing choices to reachable cellules relative to the first real machine;
    routing the message to each selected cellule in the one or more receiving cells in the spanning tree; and
    delivering the message to each message receiving machine within the one or more receiving cells.

2. The method of claim 1, further comprising the step of implementing one or more virtual machines within a real machine.

3. The method of claim 1, wherein a link is one of a virtual link between two virtual machines, and a real link between two real machines.

4. The method of claim 1, wherein the multicast distribution of the message is along links and further comprises the step of routing the message through the selected spanning tree according to precomputed cellule distribution tables associated with the each virtual machine, wherein each cellule distribution table includes a first distribution set of cellules to be used if the message is received from a neighbor in the same cell and a second distribution set of cellules to be used if the message is received from a neighbor in another cell.

5. The method of claim 4, wherein the step routing further comprises the step of determining a routing choice table for each real machine.

6. The method of claim 5, wherein the routing choice table selects machines and links according to one of random choice, round-robin least busy, least-busy, preserve message order, and preserve message order by hashing on origin identification.

7. The method of claim 5, wherein the step of determining a routing choice table further includes the step of determining a failover route for redirecting a message.

8. The method of claim 5, wherein the step of determining a routing choice table further includes the step of exchanging routing information included in the routing choice table of each machine upon the happening of an event.

9. The method of claim 8, wherein an event includes one of a machine failure and a machine recovery.

10. The method of claim 4, wherein the multicast distribution is according to the cellule distribution table and a message distribution tag including a flagged list of virtual machines.

11. The method of claim 10, wherein the message distribution tags can be one of compressed, factored between internal and external machines relevant to a sending machine, and compressed and factored.

12. The method of claim 11, further comprising the step of determining an updated message distribution tag for the message relevant to the internal and external machines of the sending machine, wherein the sending machine can be one of the first real machine and a receiving machine for forwarding the message to one or more additional receiving machines.

13. The method of claim 1, further comprising the step of scaling the message handling capacity of the network.

14. A program storage device readable by machine, tangibly embodying a program of instructions executable by the machine to perform method steps for the multicast distribution of a message from a first real machine through a network of message processing machines to one or more message receiving machines, wherein the network is organized into two or more cells including machines, and wherein one or more links between cells comprise link bundles, the method steps comprising:
    selecting a spanning tree rooted in the cell containing the first real machine, and comprised of the cells and the link bundles;
    determining one or more receiving cells including a message receiving machine on the selected spanning tree;
    selecting a cellule in each of the one or more receiving cells to receive the message, wherein each cellule comprises a set of one or more virtual machines within a cell at an end of a link bundle;
    selecting a route to each selected cellule from a routing choice table of the first real machine including potential routing choices to reachable cellules relative to the first real machine;
    routing the message to each selected cellule in the one or more receiving cells in the spanning tree; and
    delivering the message to each message receiving machine within the one or more receiving cells.

15. A method for the multicast distribution of a message from a publishing client through a network of message processing machines to a first subscribing client, wherein the network is organized into two or more cells including client machines, and wherein one or more links between cells comprise link bundles, the method comprising:
- determining, by the first subscribing client, whether the publishing client is an external neighbor outside a first cell of the first subscribing client or an internal neighbor inside the first cell of the first subscribing client;
- forwarding the message from the first subscribing client to an internal subscribing neighbor client upon determining the publishing client to be an external neighbor; and
- forwarding the message from the first subscribing client to an external subscribing neighbor client upon determining the publishing client to be an internal neighbor.

16. The method of claim 15, further comprising excluding a subscribing client in a cellule in which the first subscribing client implements a virtual machine, wherein each cellule is a disjoint subset of virtual machines within a cell.

17. The method of claim 15, further comprising excluding a subscribing external neighbor client in the first cell of the first subscribing client upon determining the publishing client to be an external neighbor.

18. The method of claim 15, further comprising excluding a virtual machine of a subscribing client within the first cell of the first subscribing client upon determining the publishing client to be an internal neighbor.

19. The method of claim 15, further comprising:
- determining whether a cellule in a second cell of the first subscribing client in which the first subscribing client implements a virtual machine has received the message via a virtual machine of a second subscribing client; and
- excluding a subscribing client within the second cell from receiving the message from the first subscribing client.

20. The method of claim 15, further comprising tagging the message, wherein a tag indicates an intended recipient client, whether the message has been received from an internal neighbor or external neighbor, whether the message has been received from an internal neighbor virtual machine or from an external neighbor virtual machine.

* * * * *